April 30, 1968    J. E. CREEDON ETAL    3,381,148

FOSSIL FUEL-FIRED THERMIONIC CONVERTERS

Filed April 2, 1965

INVENTORS,
JOHN E. CREEDON
SOL SCHNEIDER &
STUART SHAPIRO.

BY Harry M. Saragovitz,
Edward J. Kelly, Herbert Berl
Julian C. Keppler
ATTORNEYS

United States Patent Office 3,381,148
Patented Apr. 30, 1968

3,381,148
FOSSIL FUEL-FIRED THERMIONIC CONVERTERS
John E. Creedon and Sol Schneider, Little Silver, and Stuart J. Shapiro, Red Bank, N.J., assignors to the United States of America as represented by the Secretary of the Army
Filed Apr. 2, 1965, Ser. No. 445,288
3 Claims. (Cl. 310—4)

ABSTRACT OF THE DISCLOSURE

The three converters shown all include a hydrogen-permeable window for permitting hydrogen from the fuel source to diffuse out of the interelectrode space. In one embodiment the anode itself is hydrogen-permeable. In the second embodiment a separate tubular window of cylindrical shape is mounted on the anode and communicates with the interelectrode space, and in the third embodiment a hydrogen-permeable dome covers the entire anode.

---

The invention described herein may be manufactured and used by or for the Government for governmental purposes without the payment of any royalty thereon.

The present invention relates to thermionic converters and more particularly to such converters in which the cathode or emitter is heated by the burning of fossil fuels. The products of combustion of such fuels include hydrogen, among other gases. In spite of efforts to keep such gases from entering the sealed envelope of the converter, appreciable amounts thereof will penetrate the envelope due to the elevated temperature of the cathode to which the heat is applied and also due to the reduced pressure within the converter envelope. Hydrogen permeates the converter envelope more readily than other gases and the presence of hydrogen can have deleterious effects on converter operation from both electron-hydrogen collisions and heat loss through conduction. The present invention comprises a novel thermionic converter with means for automatically maintaining the partial pressure of hydrogen within the converter envelope at such a level that normal converter operation is unimpaired. In its simplest form the invention may comprise a hydrogen-permeable window which allows the hydrogen molecules within the converter to diffuse out of the envelope to the external atmosphere. Since nickel is both hydrogen-permeable and also has a desirable work function for use as an anode or collector in a thermionic converter, a nickel anode may serve also as the hydrogen-permeable window. The rate of hydrogen diffusion through the window will depend on the window thickness, area, material, and the internal and external pressures. Therefore, the window thickness and area must be correlated with the rate of hydrogen buildup within the converter in order to keep the internal pressure below that at which converter operation is impaired. In some cases these considerations will result in a window which is too thin to withstand the pressure of the external atmosphere as well as the heating caused by the electron bombardment of the anode which is characteristic of the normal converter action. In these cases the anode and the hydrogen-permeable window should comprise separate elements and the window can take various shapes in order to maximize its hydrogen diffusing characteristics.

It is therefore an object of this invention to provide a novel and useful thermionic converter which is fired by the burning of fossil-type fuels.

Another object of the present invention is to prevent the accumulation of undesired gases within the envelope of a fossil-fuel-fired thermionic converter.

A still further object of this invention is to provide a simple and effective mechanism for bleeding hydrogen gas from the interior of a thermionic converter during the operation thereof.

Figure 1:
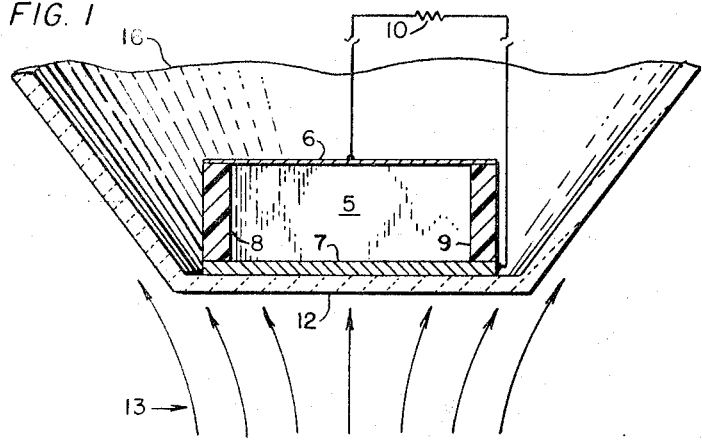
Figure 2:
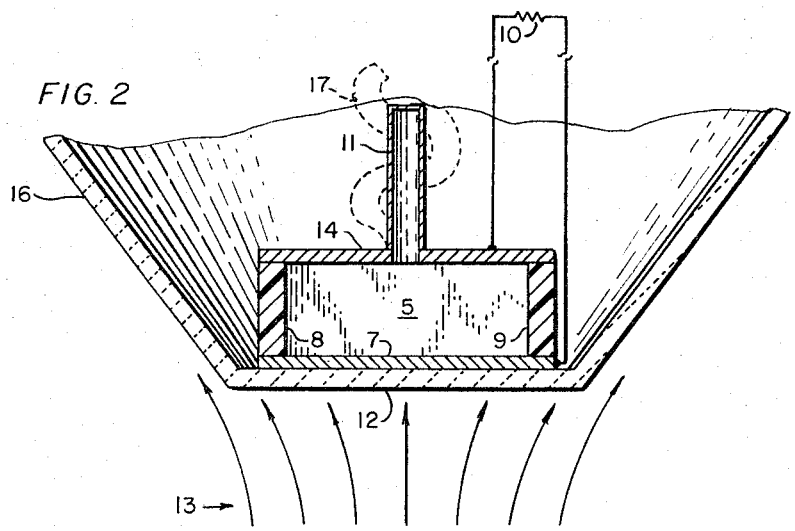
Figure 3:
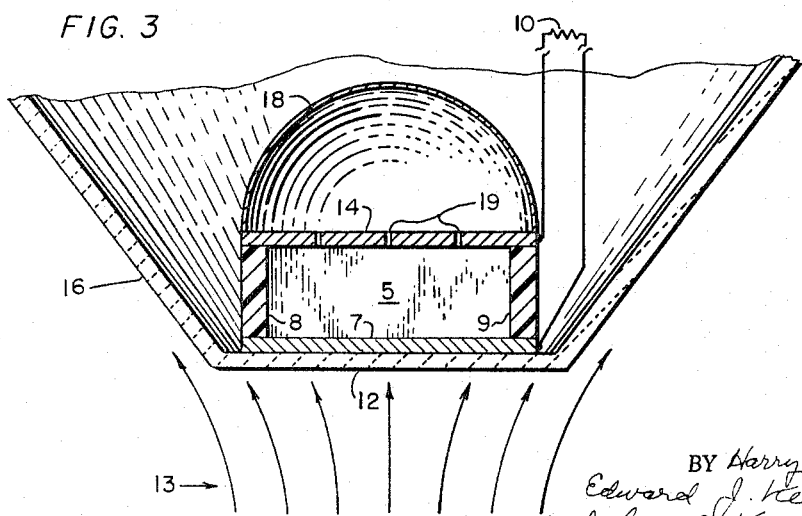

These and other objects and advantages of the invention will become apparent from the following detailed description and drawings, in which:

FIG. 1 is a schematic, cross-sectional diagram of a preferred embodiment of the invention, and FIGS. 2 and 3 are modifications of the embodiment of FIG. 1.

In FIG. 1 the thermionic converter is schematically illustrated by means of a pair of spaced parallel metal plates 6 and 7 which comprise respectively the anode (or collector) and the cathode (or emitter). The sidewalls 8 and 9, which are electrically non-conductive, complete the envelope to form a substantially gas-tight cavity 5. A gas such as cesium vapor may be introduced into the converter to increase the electrical output thereof. An electrical load 10 is connected between the anode and cathode of the converter. Heat is applied to the converter cathode 7 from a heat source below as indicated by the arrows 13. The gas shield 12, which may be a ceramic material, covers the cathode and includes upwardly directed flanges 16 for deflecting the hot gases away from the converter after they have passed the cathode.

A thermionic converter generates electricity by utilizing the Edison effect. Electrons are "boiled off" of the heated cathode which has a work function higher than that of the anode. Some of the electrons have sufficient energy to reach the anode and these electrons are returned to the cathode through an external load which constitutes the output of the device.

As mentioned above, when fossil fuels are used to fire such converters, some of the products of combustion will diffuse through both the gas shield and the cathode to the envelope interior, where they can rapidly accumulate to such an extent that converter operation is impaired. It can be shown both empirically and theoretically that the rate of diffusion of any given gas through a metal plate varies directly with the surface area, directly with the pressure difference between the two sides of the plate, inversely with the plate thickness, and increases exponentially with temperature. Also, the diffusion rate is affected by the molecular structure of the gas and the type of metal through which it diffuses. Hydrogen, having a simple molecular structure, will permeate any given solid metal more easily than other gases. This fact accounts for the preponderance of hydrogen diffusion into the converter compared to the other more massive gases comprising the products of combustion. Also, the difference in molecular weight between hydrogen and the gas which forms the atmosphere within the converter makes it possible to bleed off or diffuse the hydrogen through the window to the external atmosphere without any apparent reduction in the pressure of the heavier gas caused by the same mechanism. Further, the fact that there is little or no hydrogen in the air permits the use of a hydrogen-permeable window open to the atmosphere without any substantial reverse diffusion therethrough into the converter.

In designing a thermionic converter such as described herein, the first step is to determine the amount of partial pressure of hydrogen which can be tolerated within the converter envelope. Given this pressure the amount of hydrogen diffusion into the envelope through the cathode can be found from the operating temperature, the pressure of the products of combustion, and the physical characteristics of the cathode. Since, in the steady state, the amount of hydrogen diffused out through the hydrogen-permeable window must equal that diffused in through the cathode, the tolerable hydrogen pressure together with the calculated or measured rate of inward diffusion will determine the area, thickness and material of the hydrogen-permeable window.

In accordance with the above principles, the converter of FIG. 1 utilizes the nickel element 6 as both an anode (or collector) and as a hydrogen-permeable window. The work function of nickel makes it desirable for use as an anode and its permeability to hydrogen as well as its mechanical strength and heat conductivity are high. The thickness of the element 6 is determined from the rate of inward diffusion of hydrogen as explained above.

In some cases the inward diffusion rate may be so great that a flat hydrogen-permeable window such as shown in FIG. 1 would be too thin to withstand the pressure differential between its two large surfaces, the heat generated by the electrons which constantly bombard it during converter operation, and still retain the mechanical strength to hold the device together. In such cases the modifications shown in FIGS. 2 and 3 may be advantageously utilized.

In FIG. 2, the thermionic converter shown therein comprises elements 5, 7, 8, 9, 10, 12 and 16 which perform the same functions as the correspondingly referenced elements of FIG. 1. The anode 14 comprises a flat plate of suitable metal and may be made as thick as necessary to provide the required mechanical strength and heat dissipation ability. The closed cylinder 11 which is shown mounted on anode 14 comprises the hydrogen-permeable window. Since the structure of the anode and the window are now separate, the design of each can be optimized for its particular function. For example, the surface area of the window 11 may be increased simply by extending its height. This will increase the diffusion rate therethrough at any given window thickness and therefore provide additional mechanical strength for withstanding the external pressures. In order to save space the window 11 may be bent for example into the shape of a helix, as illustrated by the dashed outline 17. Also, other materials besides nickel can be used for the hydrogen-permeable window and such metals need not necessarily possess the characteristics of anodes. For instance palladium is even more permeable to hydrogen than is nickel and this metal can be used for the window in such cases.

In the modification shown in FIG. 3 the anode 14 again is composed of a metal of suitable work function and mechanical strength but the hydrogen-permeable window comprises arcuate or hemispherical dome 18 of suitable material. Again the shape of the window 18 results in a larger surface area which permits the use of thicker metal for this element with the consequent increased ability to withstand the exterior pressure. Also, the domed shape of the window 18 enables it to withstand greater pressures from the outside or convex surface thereof. One or more holes 19 are provided in the anode 14 so that hydrogen from the interelectrode space may drift therethrough and thence out through the dome.

While the invention has been described in connection with several illustrative embodiments, the inventive concepts disclosed herein are of general application and hence the invention may be practiced other than as specifically described herein. Accordingly, the invention should be limited only by the scope of the appended claims.

What is claimed is:

1. A fossil fuel-fired thermionic converter comprising an anode and a cathode sealed in an envelope, a hydrogen-permeable hemispheric dome covering said anode, at least one hole in said anode whereby hydrogen from the interelectrode space may drift therethrough and thence diffuse out of said converter through said hemispheric dome.

2. The converter of claim 1 wherein said hemispheric dome is composed of nickel.

3. The converter of claim 1 wherein said anode is planar.

References Cited

UNITED STATES PATENTS

| | | | |
|---|---|---|---|
| 2,493,659 | 1/1950 | Dorgelo | 313—174 XR |
| 2,692,959 | 10/1954 | Wright | 313—212 XR |
| 2,841,733 | 7/1958 | Hodge | 313—221 XR |
| 2,921,210 | 1/1960 | Schaschl et al. | 313—221 XR |
| 3,215,868 | 11/1965 | Pidd et al. | 310—4 |
| 3,312,840 | 4/1967 | Gabor | 310—4 |
| 3,322,979 | 5/1967 | Clendinning et al. | 310—4 |
| 3,341,719 | 9/1967 | Burhorn et al. | 310—4 |

FOREIGN PATENTS

| | | |
|---|---|---|
| 1,166,306 | 3/1964 | Germany. |

MILTON O. HIRSHFIELD, *Primary Examiner.*

D. F. DUGGAN, *Assistant Examiner.*